United States Patent [19]

Goel et al.

[11] Patent Number: 5,098,505
[45] Date of Patent: Mar. 24, 1992

[54] EPOXY RESIN, THERMOPLASTIC POLYMER AND HARDENER ADHESIVE

[75] Inventors: Anil B. Goel, Worthington; Harvey J. Richards; Jeffrey P. Jones, both of Columbus, all of Ohio

[73] Assignee: Ashland Oil, Inc., Russell, Ky.

[21] Appl. No.: 90,879

[22] Filed: Aug. 31, 1987

Related U.S. Application Data

[62] Division of Ser. No. 6,877,558, Jun. 23, 1986, abandoned.

[51] Int. Cl.$^5$ .............................. C09J 5/00; C09J 5/06; C09J 163/02
[52] U.S. Cl. ................................. 156/307.3; 156/330; 525/410; 525/411; 525/423
[58] Field of Search ....................... 525/410, 411, 423; 156/307.3, 330

[56] References Cited

U.S. PATENT DOCUMENTS

| | | | |
|---|---|---|---|
| 3,670,046 | 6/1972 | Tomalia et al. | 525/423 |
| 4,070,225 | 1/1978 | Batdorf | 525/423 |
| 4,128,525 | 12/1978 | Yeakey et al. | 525/423 |
| 4,133,803 | 1/1979 | Klein | 525/423 |
| 4,547,530 | 10/1985 | McCreedy et al. | 525/410 |
| 4,762,883 | 8/1988 | Goel | 525/113 |
| 4,871,803 | 10/1989 | Zimmel et al. | 525/113 |

FOREIGN PATENT DOCUMENTS 1420336  1/1976  United Kingdom ................ 525/423

OTHER PUBLICATIONS

Lee and Neville, *Handbook of Epoxy Resins*, 1982 Reissue, McGraw-Hill Book Co., New York, N.Y., 1967, pp. 7-2 to 7-5, 6-3, 10-2 to 10-4, 22-21, 22-24, and 24-27.

*Primary Examiner*—John C. Bleutge
*Assistant Examiner*—Robert Sellers
*Attorney, Agent, or Firm*—John F. Jones

[57] ABSTRACT

An adhesive composition comprising
(A) An epoxide resin component,
(B) A hardener component, and incorporated in either or both/or (A) and (B) a thermoplastic polymer, mixtures thereof and application of said mixtures to substrate surfaces to adhere said surfaces together are described.

4 Claims, No Drawings

EPOXY RESIN, THERMOPLASTIC POLYMER AND HARDENER ADHESIVE

This is a divisional application of copending U.S. patent application Ser. No. 877,558 filed 06/23/86, now abandoned.

This invention relates to two component structural adhesive compositions of the epoxy type which have good gravity flow properties in each of the two components but which rapidly develop non-sag character after the two components are mixed and the preparation of these adhesives by using a phase out phenomenon produced by the inclusion of certain polymeric additives in either or both of the two components of the adhesive.

A variety of active hydrogen compounds including polyamines, polyphenols, carboxylic acids, and the like have been used as curing agents or hardeners for epoxide resins to give thermosetting polymers as is well known in the art. The use of such epoxy resins as adhesives for a variety of applications is also well known in the art. It is also well known in the art to use thixotropic agents such as silica and the like to give non-sag properties to epoxy adhesives which are used on vertical surfaces although the thixotropic properties are not latent in such systems and the non-sagging individual components thus prepared are not gravity flowable (readily pourable at ambient temperatures) and require pressure pumping in order to feed them into the mixing gun which is the usual type of apparatus used in applying the adhesive to the particular substrate.

We have discovered that the use of certain monomers and polymers described in detail below in one or both of the two components of an epoxy adhesive system results in phase separation on mixing of the components thus providing gravity flowable individual components and non-sagging mixtures thereof which materials are particularly useful in applying the adhesive to vertical surfaces of substrates.

The usual two-component epoxy adhesive systems are made up of a first component which is primarily the epoxy resin component and a second component which is primarily the curing agent or hardener which can be a polyamine, polyacid, polymercaptan, polyphenol, polyamide or a polyurea just to mention a few epoxy resin hardeners known in the art.

The epoxy resins or polyepoxides useful in this invention can be monomeric or polymeric, saturated or unsaturated, aliphatic, cycloaliphatic, aromatic or heterocyclic, and they may be substituted if desired with other substitutents besides the epoxy groups, e.g., hydroxyl groups, ether radicals, halogen atoms, and the like. Typical epoxy components suitable in the practice of this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula:

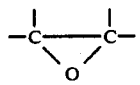

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized olefinically unsaturated carboxylic acid esters, such as methyl-9,10,12,13-diepoxy stearate, or the dimethyl ester of 6,7,10,11-diepoxy hexadecane-1,16-dicarboxylic acid. Furthermore, there may be mentioned epoxidized mono-, di-, or polyesters and mono-, di-, or polyacetals containing at least one cylcoaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

Although two component epoxy adhesives of the prior art when cured have good adhesion properties towards structural substrates, including steel and thermoset plastics and reinforced thermosets, the usual two component adhesive formulations lack one or more of the following desired features of high performance adhesives; particularly the non-sag behavior in the mixed composition.

Individual components with low viscosities (generally less than 200,000 cps) enabling them to be used by gravity feed method.

Non-critical mix ratios of components, possibility for foolproof mixing (plus or minus 50% variation).

Non-sag (thixotropic) character of the mixed adhesive before gellation to avoid sagging particularly on vertical surfaces.

Reasonably long room temperature applying open time (pot life) (usually about 20–30 minutes).

Rapid curing (or gelling) upon heat (preferably at about 100 degrees C. in about 5 minutes).

No need of rigorous surface preparation of the substrate (cleaning, scratching, scrubbing, priming, etc.)

High flexibility and tough adhesive bond with high shear and peel strengths at temperatures of from room temperature to 200 degrees F.

Low hygroscopicity of adhesive.

We have discovered that the use of certain thermoplastic polymer additives dissolved in one of the components of a two component epoxy adhesive formulation will provide the desired gravity flow property and exhibit non-sag character and other desirable features given above upon mixing with the other component by a rapid phasing out of the solution. The oligomeric or polymeric additives of this invention may be used as such or may be prepared in situ by the reactions of monomers. An example of this type of in situ formation of oligomers or polymers include the reactions of lactones or cyclic carbonates with polyamines. The type of thermoplastic polymeric additives which are miscible and stable in either the epoxy resin component or the hardener component of the adhesive include polyoxazolines, polyamides, polysulfones, polycarbonates, polyesters, polyurethanes, mixtures thereof and the like.

In addition to the application of these thermoplastic polymers as non-sag additives, their presence also helps reduce the shrinkage of the cured adhesive polymer by phase out phenomenon (Robert Burns, "Polyester Molding Compounds," Marcel Decker, N.Y., 1982, P.62) and also improve the toughness of the thermoset polymer. By using the phasing out concept as means for obtaining the non-sag property in the final adhesive system, several two component adhesive compositions were obtained. In a typical adhesive composition of this type, the epoxy resin component comprises liquid di- or polyepoxide resin mixed with small amounts (1 to 8% by weight) of the thermoplastic polymer and optionally some rubber to improve the flexibility and toughness of the final cured adhesive polymer. Diluents such as monoepoxides and amine curing accelerators such as triphenyl phosphite and chemical thixotropic reagents such as polyisocyanates may also be included optionally in this component. This liquid gravity flow epoxy component may be filled with fillers such as talc, kaolin, aluminum oxide, fumed silica, etc. to the extent that the filled component maintains the gravity flow property. The component can be poured readily from a container at about ambient temperatures. The hardener component which is used to cure the above epoxy component comprises a curing agent for the epoxy resin which can be a polyamine (primary, secondary, and tertiary amines) and/or polyamidoamines mixed with phenolics to obtain the improved curing rates.

In order to obtain flexible adhesive compositions, long chain poly(alkylene oxide) polyamines can be included in the hardener component. The hardener component may contain medium and high molecular weight poly(alkylene oxide) di- or triprimary amine (molecular weight of from 200 to 10,000); a polyamidoamine obtained from the amidation reaction of a carboxylic acid terminated molecule with an alkylene di- or polyamine, a low molecular weight amine such as aminoethyl piperazine, ethylene diamine and the like, an amine accelerator such as tertiary amine, a boron trifluoride-amine complex, and the like and phenolics such as bisphenol A and mixtures thereof. The hardener component may be filled with fillers such as talc, kaolin, aluminum oxide, fumed silica, etc. to the extent that the component maintains the gravity flow property. When the epoxy and hardener components are mixed together they give a non-sagging adhesive which can be applied on vertical surfaces of substrates and generally they have long room temperature open time (pot life) and cure rapidly at moderately elevated temperatures (such as 100° F.) in the range of from 25° C. to 200° C. The adhesive bonds which result from the use of the two component adhesives of this invention are flexible and display excellent adhesive strength on many different types of substrates. The use of thermoplastic polymers as non-sag builders by phase out phenomenon also results in reduction in the shrinkage commonly associated with the usual epoxy resin adhesive systems.

This invention is further illustrated in the following representative examples.

The following general procedure was used for the preparation of adhesive bonds throughout the following examples. The two components, i.e. the epoxy resin component (usually containing the termoplastic polymer additive) and the hardener component, were mixed in appropriate weight amounts under an inert atmosphere at room temperature. The resulting mixture was applied in the form of 3/8 inch beads across the substrate (sheet molding compound laminates, composed of unsaturated polyester-glass fiber) that measure 12 inches by 4 inches by 100 mils and the substrate samples were dry wiped with a cloth prior to application of the adhesive. After sprinkling a few 30 mil diameter glass beads on the adhesive bead to insure a final glue line thickness of 30 mils, the other laminate was placed on top of the one to which the adhesive had been applied leaving a one-inch overlap. The adhesive samples were cured by placing them in a heated fixture at 230 degree F. under 1 psi pressure for 3 minutes, and they were then placed in an oven at 285 degrees F. for post curing for 30 minutes. Test specimens were cut from these cured samples into one-inch strips for testing.

TEST PROCEDURES

The following tests were carried out by using a set of at least three samples for each type of lap shear strength test.

(A) Shear strength test at room temperature.

(B) Post baking at 400 degrees F. for an additional one hour and tested shear strength at room temperature.

(C) Shear strength test at 180 degrees F.

(D) Shear strength test at 180 degrees F. after one hour of 400 degrees F. baking.

(E) Shear strength test at room temperature after immersion of sample for 24 hours in water held at 203 degrees F.

EXAMPLE 1

Polyethyloxazoline (200,000 molecular weight obtained from Dow Chemical Company) (4 g) was dissolved in 144 g of liquid diglycidyl ether of bisphenol A (epoxy equivalent weight of 180–190) and 106g of this solution was filled with 37.5 g of dry talc. This epoxy component had gravity flow properties (readily pourable at ambient temperatures) and was designated as component "A".

EXAMPLE 2

Liquid diglycidyl ether of bisphenol A (LDGEBPA) (125 g) was filled with 43.9 g of dry talc. This liquid epoxy component having gravity flow viscosity was designated "B".

EXAMPLE 3

A rubber modified epoxy resin component was prepared by reacting liquid diglycidyl ether of bisphenol A with 38.8% by weight of a carboxylic acid terminated butadiene/acrylonitrile (18% acrylonitrile) Hycar rubber (CTBN 1300X8 from B.F. Goodrich Co.). A solution of epoxy resin containing polyethyl oxazoline was prepared by blending 100 g of the above rubber modified epoxy resin with 288 g of LDGEBDPA and 10.2 g of 200,000 molecular weight polyethyl oxazoline. A part (386.6 g) of this solution was mixed with 9 g of isophoron di-isocyanate and filled with 99.1 g of dry talc filler. This epoxy component having gravity flow viscosity was designated "C".

EXAMPLE 4

The procedure of Example 3 was followed using 95 g of liquid diglycidyl ether of bisphenol A, 10.4 g of carboxylic acid group containing butadiene/acrylonitrile (22% acrylonitrile) rubber (Hycar 1300X18 from B.F. Goodrich Co.), 2.8 g of poly ethyl oxazoline, 2.5 g of isophorone diisocyanate and 27.7 g of talc filler. This epoxy component having gravity flow viscosity was designated "D".

EXAMPLE 5

The epoxy component "C" of Example 3 (97.5 g) was blended with 3.54 g of triphenyl phosphite. This gravity flow component was designated "E".

EXAMPLE 6

A gravity flow (pourable) hardener component designated "H1" was prepared by mixing 34.1 parts by weight of poly (propylene oxide) triamine (3000 molecular weight, tri-primary amine), 9.9 parts of poly (propylene oxide) diamine (400 molecular weight di-primary amine), 12.6 parts of bisphenol A, 8.5 parts of tris (dimethyl aminomethyl) phenol and 35.1 parts of dry talc.

EXAMPLE 7

A gravity flow hardener component designated "H2" was prepared by mixing 36.5 parts by weight of 3200 molecular weight poly (propylene oxide) triamine, 5.7 parts of 400 molecular weight poly (propylene oxide) diamine, 3 parts of aminoethyl piperazine, 10 parts of tris (dimethyl aminomethyl) phenol, 12 parts of bisphenol A and 33.3 parts of talc.

EXAMPLE 8

The epoxy component of Example 1 designated "A" (60 g) and the hardener component of Example 6 designated "H1" (60 g) were mixed. The mixed composition showed good non-sag behavior when applied in the form of a 4 mm thick bead on a vertical surface. The room temperature open time of the adhesive composition once mixed was in excess of 30 minutes and the 230 degrees F. gel time was 3 minutes for the mixture. The shrinkage of the cured polymer was determined to be about 1%. The adhesive bonds were made from this mixed adhesive on sheet molding compound (SMC) sheets obtained from Diversitech General (GT7113 laminates) and were tested by following the procedure outlined earlier. The testing results are summarized in Table 1. For comparison purposes, when the epoxy components of Example 2 having no thermoplastic polymer was mixed with the hardener of Example 6 in 1.5 to 1 weight ratio, the mixed adhesive showed poor non-sag property and also showed higher shrinkage (1.3%).

TABLE 1

| Sample No. | Test Procedure | Lap Shear Strength (psi) |
|---|---|---|
| 1 | A | 495 (DL)* |
| 2 | A | 460 (DL) |
| 3 | A | 465 (DL) |
| 4 | B | 350 (DL) |
| 5 | B | 390 (DL) |
| 6 | B | 380 (DL) |
| 7 | C | 360 (DL) |
| 8 | C | 340 (DL) |
| 9 | C | 350 (FT)** |
| 10 | D | 340 (DL) |
| 11 | D | 360 (DL) |
| 12 | D | 350 (DL) |

*DL - substrate delaminated at the bond line
**FT - surface fiber tear at the bond line.

EXAMPLE 9

The epoxy component of Example 3 designated "C" (30 g) and hardener component of Example 7 designated "H2" (20 g) were mixed and applied on vertical substrates showing good non-sag behavior. The mixed adhesive composition had room temperature open time of greater than 30 minutes and 230 degrees F. gel time of 3 minutes. The adhesive lap shear test bonds were prepared by following the general procedure described above and the test results are given in Table 2 under System 1. Similarly the epoxy component of Example 4 designated "D" (30 g) and hardener of Example 7 designated "H2" (20 g) were mixed and showed good non-sag behavior on vertical substrates, room temperature open time of greater than 30 minutes and 230 degree F. gel time of 3 minutes. The lap shear test results are given in Table 2 under System 2.

TABLE 2

| Sample Number | Test Procedure | Lap Shear Strength (psi)* | |
|---|---|---|---|
| | | System 1 | System 2 |
| 1 | A | 425 | 430 |
| 2 | A | 530 | 480 |
| 3 | A | 510 | 450 |
| 4 | A | 450 | 410 |
| 5 | B | 440 | 335 |
| 6 | B | 380 | 340 |
| 7 | B | 360 | 420 |
| 8 | B | 440 | 425 |
| 9 | C | 330 | 410 |
| 10 | C | 345 | 395 |
| 11 | C | 400 | 385 |
| 12 | C | 265 | 395 |
| 13 | D | 320 | 310 |
| 14 | D | 365 | 300 |
| 15 | D | 350 | 405 |
| 16 | D | 340 | 345 |
| 17 | E | 310 | 365 |
| 18 | E | 340 | 360 |
| 19 | E | 310 | 330 |
| 20 | E | 330 | 340 |

*All test samples showed delamination at the bond line.

EXAMPLE 10

The epoxy component of Example 5, "E", (30 g) and hardener component of Example 7, "H2", (20 g) were mixed and the resulting mixture was found to have non-sag properties on vertical surfaces. The room temperature open time for the mixture was found to be greater than 30 minutes, however, the 230 degrees F. cure time was found to be 2.5 minutes indicating that the role of triphenyl phosphite present in the epoxy component is that of a latent accelerator. The lap shear test results by test procedures A, B, and C showed a high degree of delamination and fiber tear in the substrates.

EXAMPLE 11

An epoxy component was prepared by following the procedure of Example 3 using 76 parts by weight of liquid diglycidyl ether of bisphenol A, 4 parts of polysulfone (50,000 molecular weight) and 20 parts of talc. This epoxy component when mixed with hardener component of Example 6, "H1" in approximately 1.5:1 weight ratio showed good non-sag behavior and the room temperature open time of the adhesive composition was observed to be greater than 30 minutes with a 230 degree F. gel time of 3 minutes.

EXAMPLE 12

An epoxy component was prepared by following the procedure of Example 3 using 77 parts by weight of liquid diglycidyl ether of bisphenol A, 3 parts of the polycarbonate of bisphenol A (molecular weight of 50,000) and 20 parts of talc. This gravity flow epoxy component was mixed with hardener component of Example 7, "H2" in approximately 1.4:1 weight ratio. The resulting non-sag adhesive composition showed open time of greater than 30 minutes and a 230 degrees F. gel time of 2.6 minutes indicating the role of the polycarbonate to be both non-sag property builder and as latent cure accelerator.

We claim:

1. The process for adhering at least two substrate surfaces to each other comprising intercalating between said surfaces a thermosetting adhesive comprising a mixture of:
   (A) an epoxide resin component which is a liquid glycidyl ether of bisphenol A and
   (B) a hardener component comprising a poly(alkylene oxide) di- or triprimary amine, a polyamidoamine obtained from the amidation reaction of a carboxylic acid terminated molecule with an alkylene di- or polyamine, aminoethyl piperazine, ethylene diamine, a tertiary amine, a boron trifluoride-amine complex or a phenolic compound or mixtures thereof and incorporated in
either or both of (A) and (B) a termoplastic polymer which is a polyoxazoline and curing at a temperature in the range of from 25° to 200° C.

2. The process of claim 1 wherein at least one of the surfaces is a sheet molding compound structure composed of a cured mass of an unsaturated polyester-glass fiber mixture.

3. The process of claim 1 wherein the hardener component contains poly(propylene oxide) triamine, poly(propylene oxide) diamine, bisphenol A and tris(dimethylaminomethyl) phenol.

4. The process of claim 1 wherein the hardener component contains poly(propylene oxide) triamine, poly(propylene oxide diamine), aminoethyl piperazine, tris(dimethylaminomethyl) phenol and bisphenol A.

* * * * *